United States Patent [19]

Huber et al.

[11] Patent Number: 4,993,315
[45] Date of Patent: Feb. 19, 1991

[54] COFFEE PERCOLATOR

[75] Inventors: Siegfried Huber, Kuchen; Hans Motsch, Geislingen/Steige; Hermann Riegert, Treffelhausen; Rolf Ritter, Geislingen/Steige; Erwin Schöll, Kuchen; Konrad Walter, Altheim/Alb; Gehard Wittlinger, Geislingen/Steige, all of Fed. Rep. of Germany

[73] Assignee: WMF Wurttembergische Metallwarenfabrik AG, Fed. Rep. of Germany

[21] Appl. No.: 208,179

[22] Filed: Jun. 16, 1988

[30] Foreign Application Priority Data

Jun. 16, 1987 [DE] Fed. Rep. of Germany ....... 3720149

[51] Int. Cl.⁵ .............................................. A47S 31/00
[52] U.S. Cl. .................................. 99/289 R; 100/116; 210/251
[58] Field of Search ...................... 99/279, 287, 289 A, 99/289 P, 289 D, 295, 297, 300, 302 R, 302 P, 305; 426/433; 100/125, 116, 124; 210/251, 263, 291, 481, 282

[56] References Cited

U.S. PATENT DOCUMENTS

| 2,811,098 | 10/1957 | Pavlecka . |
| 2,935,011 | 5/1960 | Perlman . |
| 3,021,254 | 2/1962 | Helversen ............................ 100/127 |
| 3,064,553 | 11/1962 | Semjian ............................. 99/289 R |
| 3,089,404 | 5/1963 | Parraga . |
| 3,361,052 | 1/1968 | Weber . |
| 4,271,752 | 6/1981 | Valente ............................ 99/289 R |

FOREIGN PATENT DOCUMENTS

3435362  9/1984 Fed. Rep. of Germany .

Primary Examiner—Robert W. Jenkins
Attorney, Agent, or Firm—Arnold, White & Durkee

[57] ABSTRACT

A coffee percolator having a brewing chamber wherein at least one of the boundary wall surfaces of the brewing chambr is adjustable transversely of the direction of flow of the hot water through the coffee powder so that the thickness of the coffee powder bed in the direction of flow may be kept substantially constant for the coffee charges of varying size. The coffee percolator may include a brewing sieve having a support sieve with openings of a size exceeding the dimensions of the ground coffee particles and a fine sieve supported on the side of said support sieve facing towards the brewing chamber and having openings of a size smaller than the dimensions of the ground coffee particles.

19 Claims, 6 Drawing Sheets

COFFEE PERCOLATOR

BACKGROUND OF THE INVENTION

1. Field of the Invention

The present invention relates generally to coffee percolators, and more particularly, to a coffee percolator having a brewing chamber which includes a boundary wall surface adapted to be adjusted to maintain a constant thickness of the ground coffee bed when using different amounts of ground coffee for brewing different charges of coffee.

2. Description of the Prior Art

Coffee percolators having a brewing chamber for receiving variable amounts of ground coffee are generally known. For example, a coffee percolator of this type is shown in German Patent No. 26 57 355. In this coffee percolator the brewing chamber is of cylindrical configuration and has a cover provided with a closable ground coffee filler opening and a hot water supply tube. Supported above the conical bottom of the brewing chamber is an annular filter sieve adapted to have a bed of ground coffee formed thereon. Above the filter sieve the cross-sectional area of the brewing chamber is substantially constant and invariable over the full height of the brewing chamber. When using this coffee percolator for brewing variable charges of coffee, the brewing chamber is filled with correspondingly varying amounts of ground coffee. This results in a variable thickness of the bed of ground coffee formed on the filter sieve. If it is intended for instance to brew only a single cup of coffee, the ground coffee bed is relatively thin. This permits the hot water to percolate relatively fast, so that the resulting coffee is of inferior quality. On the other hand, the time it takes for the hot water to percolate through the ground coffee is excessively extended when a greater amount of ground coffee is metered into the brewing chamber for brewing a greater quantity of coffee, for instance a one-liter jug. The problem of the inferior quality of a single-cup charge has been solved in practical use by overdosing the ground coffee, i.e. by metering a greater amount of ground coffee into the brewing chamber than would in fact be necessary with optimum exploitation of the ground coffee. This method is relatively uneconomical, however, when it is desired to brew a greater number of single-cup charges. The extended percolation time, on the other hand, in the case of greater charges, had to be accepted as unavoidable.

Described in DE-OS 25 18 693 is a coffee filter intended to ensure optimum exploitation of the coffee powder also in the case of variable brewing charges. In this coffee filter, the brewing chamber above the filter sieve is divided into a plurality of compartments of different size. The hot water inlet is arranged so as to open into the smallest compartment. For brewing a small charge of coffee, the ground coffee is supplied only to the smallest compartment before adding a correspondingly metered amount of hot water. For brewing a charge of intermediate volume, all of the ground coffee is again supplied to the smallest compartment. When subsequently adding a correspondingly increased volume of hot water, the excess amount of water is supposed to overflow into the median compartment and to carry a corresponding amount of ground coffee along in the process. Even when it is intended to brew the greatest possible charge, all of the ground coffee is still supplied to the smallest compartment, the subsequently added hot water being then supposed to ensure the distribution of the ground coffee over all of the filter surface. It is to be doubted, however, whether this principle does in fact result in a beverage of improved quality. It is rather to be assumed that the amount of ground coffee carried along by the hot water as it overflows into adjacent compartments is insufficient for brewing a coffee of satisfactory quality also in these adjacent compartments. When the major proportion of the initially metered ground coffee remains in the first compartment, it leaves only relatively little space for hot water, so that the coffee obtained from the first compartment will be very strong, its amount will be insufficient, however, for imparting the desired full flavor to the relatively thin coffee obtained from the other compartments.

In the case of espresso machines, it is shown, for instance from CH Patent 588,243, or from CH Patent 559,535, or from WO 07/01570, respectively, to provide a brewing chamber with an adjustable boundary wall surface. However, this construction serves only the purpose of compacting the ground coffee in the manner typical for the preparation of espresso. In both of the espresso machines described, the hot water inlet is provided on the upper side of the brewing chamber, while the finished beverage exits through one of the vertical sidewalls. The opposite vertical sidewall is disposed on a piston and acts as the adjustable boundary wall surface mounted for displacement substantially parallel to the direction of flow of the hot water through the ground coffee. The hot water percolates through the compacted ground coffee substantially in the direction of the longitudinal axis of the cylindrical body formed by the compacted coffee powder. The height of the compacted cylindrical body may be doubled for preparing two cups of espresso at once. In this case the hot water has to percolate through a bed of ground coffee of considerably greater thickness.

As the hot water in the case of the two first-named espresso machines enters the brewing chamber at one or two locations on the periphery thereof, while the beverage exits through a brewing sieve at the location of one of the vertical sidewalls, the exploitation of the coffee powder is still less efficient than in the case of coffee percolators in which the hot water enters substantially parallel to the brewing sieve and percolates through the coffee powder bed in a substantially vertical direction. The last-named espresso machine is not designed for preparing variable brewing charges.

An adjustment to variable brewing charges, particularly to the degree required in the case of filter coffee percolators, cannot be accomplished with a brewing apparatus of this design without having to put up with a degradation of quality or substantially extended brewing times.

Shown in German Utility Model 85 29 010 is a coffee filter with a manually insertable insert for obtaining uniform thickness of the ground coffee bed irrespective of the funnel-shape of the filter casing. This construction is not suitable, however, for variable brewing charges because the water tends to flow over the ground coffee, particularly in the case of small brewing charges. A displaceable boundary wall surface for adjustment to variable brewing charges is not provided.

SUMMARY OF THE INVENTION

It is therefore an object of the present invention, in a structurally simple manner to improve a coffee percolator of the type described in such a manner that variable brewing charges of coffee of satisfactory quality can be prepared without having to overdose the coffee powder or having to put up with excessively long percolation times.

This object is attained according to the invention by providing in the brewing chamber at least one boundary wall surface adequate to be adjusted substantially transversely to the direction of flow of the hot water to obtain a substantially constant thickness in the direction of flow of the ground coffee bed when using different amounts of ground coffee for brewing different charges of coffee.

The construction according to the invention permits the cross-sectional percolation area of the brewing chamber to be adjusted to the required amount of ground coffee in such a manner that the flow path of the hot water through the ground coffee is substantially of the same length for any brewing charge. Depending on whether more emphasis is placed on complete exploitation of the ground coffee or on an extremely short percolation time, the distance between the hot water inlet and the beverage outlet will be determined to be greater or smaller than about 20 mm, in particular between 10 and 30 mm.

A coffee percolator according to the present invention has a brewing chamber formed with a hot water inlet and a beverage outlet disposed opposite said hot water inlet. Said brewing chamber being adapted to receive, particularly in an automatic manner, with variable amounts of ground coffee to thereby form a ground coffee bed for the hot water to percolate through for brewing variable charges of coffee. The brewing chamber has a boundary wall surface adapted to be a adjusted substantially transversely of the direction of flow of the hot water to thereby obtain a substantially constant thickness in the direction of flow of the ground coffee bed when using different amounts of ground coffee for brewing different charges of coffee. In a preferred form of the present invention, the brewing chamber of the coffee percolator is formed as an enclosed space with the distance between the hot water inlet and the beverage outlet substantially corresponding to the desired thickness of the ground coffee bed. The present invention thus permits a predetermined thickness of the ground coffee bed to be maintained constant in a structurally simple manner.

The coffee percolator of the present invention may also include a distributor chamber along a boundary wall of the brewing chamber having a distributor sieve substantially impermeable to the ground coffee interposed between the distributor chamber and the brewing chamber which allows communication between the distributor chamber and the brewing chamber. Similarly, a beverage collecting chamber along the opposite boundary wall has a brewing sieve substantially permeable to the ground coffee interposed between the beverage collecting chamber and the brewing chamber which allows communication between the beverage collecting chamber and the brewing chamber. The use of the distributor chamber and the beverage collecting chamber along with the distributor sieve and brewing sieve are effective to improve the controlled and uniformed introduction of the hot water and the uniform and rapid discharge of the finished coffee.

In its preferred form, the brewing sieve is a fine sieve with micro-openings which may be used for filtering the coffee to thereby avoid the passage of ground coffee even without the employ of paper filters or the like. It is to be noted, however, that fine sieves with micro-openings have to be relatively thin in order to prevent ground coffee particles from getting permanently caught in the sieve openings. Due to their relatively small thickness, such sieves are of relatively low mechanical strength. The use however of a support sieve having greater sieve openings not interfering with the flow of coffee therethrough, and which may therefore also be of a greater thickness, enables micro-porous fine sieves to be easily employed for purposes of the present invention. Micro-porous fine sieves of the type referred to are shown in U.S. Pat. No. 4,694,737. The present invention thus preferably includes a brewing sieve having a support sieve with openings of a size exceeding the dimensions of the ground coffee particles and a fine sieve supported on the side of said support sieve facing towards the brewing chamber and having openings of a size smaller than the dimensions of the ground coffee particles.

The present invention may further include a cover for covering the hot water inlet openings and beverage outlet openings not required for brewing smaller coffee charges in a brewing chamber of reduced size. The cover slide member thus permits the controlled entry of hot water only in the portion of the brewing chamber containing ground coffee.

The adjustable boundary wall surface of a coffee percolator according to the present invention is preferably designed to be resiliently yieldable in the direction perpendicular to the flow direction. Resilience of the adjustable boundary wall surface equalizes any possible nonuniform distribution of the coffee powder to thereby obtain an approximately constant compaction over the cross-sectional area.

A coffee percolator according to the present invention includes a brewing chamber formed of a cylinder disposed substantially upright in the brewing position having the adjustable boundary wall formed of a piston with a substantially horizontal boundary wall surface. A cover slide member is mounted within the cylinder covering the hot water inlet openings and beverage outlet openings not required for the desired coffee charge. As is apparent to one of skill in the art however, the use of a brewing chamber of various configurations such as oval, square, rectangular, etc. may also be used.

The present invention may also include a removable cover for closing the side of the brewing chamber opposite the adjustable boundary wall surface. The use of such a cover permits the coffee powder to be introduced into the brewing chamber at the side thereof located opposite to the boundary wall surface. In a preferred form, the side of the cover facing towards the brewing chamber is of conical configuration.

The use of a cover having a conical side results in an improvement of the brewing operation when brewing small amounts of coffee. When the conical shape is directed outward, the brewing particularly of normal coffee, is improved because a greater brewing sieve area is available thus permitting the coffee to flow off more rapidly. The increased size of the brewing sieve area is of particular advantage when a relatively great diameter is selected for the brewing chamber for improving the exploitation of the coffee powder so that in the case of a small amount of coffee powder for a single cup, the filling height is relatively small by comparison to the distance between the brewing sieve and the hot water distributor sieve. When the conical shape is directed inward however, it is effective to improve the brewing of small amounts of espresso due to an increase of the inherent filtering action of the coffee powder itself.

The brewing chamber of a coffee percolator in accordance with the present invention may be enclosed by a tubular sieve, and the distributor chamber and the beverage collecting chamber may thus be disposed on diametrically opposite sides of the tubular sieve.

In a preferred form, the cross-section of the brewing chamber is of annular cross-sectional shape in the flow direction of the hot water. In this embodiment, the hot water inlet extends through the outer annular wall and the beverage outlet extends through the inner annular wall. This results in a brewing sieve area of relatively small size as compared to the hot water distributor area. This results in an improved inherent filtering action of the ground coffee itself. Smaller coffee powder particles collect in front of the openings of the brewing sieve so that only very small amounts of sediment components can pass from the coffee powder into the beverage. The relatively small size of the brewing sieve area notwithstanding, the water percolates through all of the ground coffee. There are no dead corners or angles that might not or not sufficiently reached by the brewing water as it flows from the distributor sieve to the brewing sieve.

In yet another preferred form of the present invention, the inner annular wall is formed as a sieve piston and mounted displaceably relative to the boundary wall surface. This construction permits the brewing sieve to be retracted from the brewing chamber when the latter is being filled with the coffee powder. Before initiating the brewing operation, the piston will then be returned upwards as a result of which the coffee powder bed is substantially equalized and pre-compacted to a certain degree.

The sieve, adapted for use in a percolator of the present invention having an adjustable boundary wall surface, preferably includes sieve openings which vary over the adjustment stroke of the adjustable boundary wall surface. The size of the sieve openings increases in the direction towards the adjustable boundary wall surface. Preferably the cross-sectional area of the sieve openings is substantially constant over the full height of the brewing chamber. The size of the sieve openings may vary progressively or by degree to thereby establish different filtration or coffee percolation speeds when using different quantities of coffee powder. In this case, the relatively small sieve openings are exclusively available for smaller brewing charges while the relatively large sieve openings are additionally opened for greater brewing charges.

BRIEF DESCRIPTION OF THE DRAWINGS

Embodiments of the invention shall now be described by way of example with reference to the accompanying drawings, wherein.

DETAILED DESCRIPTION OF THE INVENTION

Figure 1:
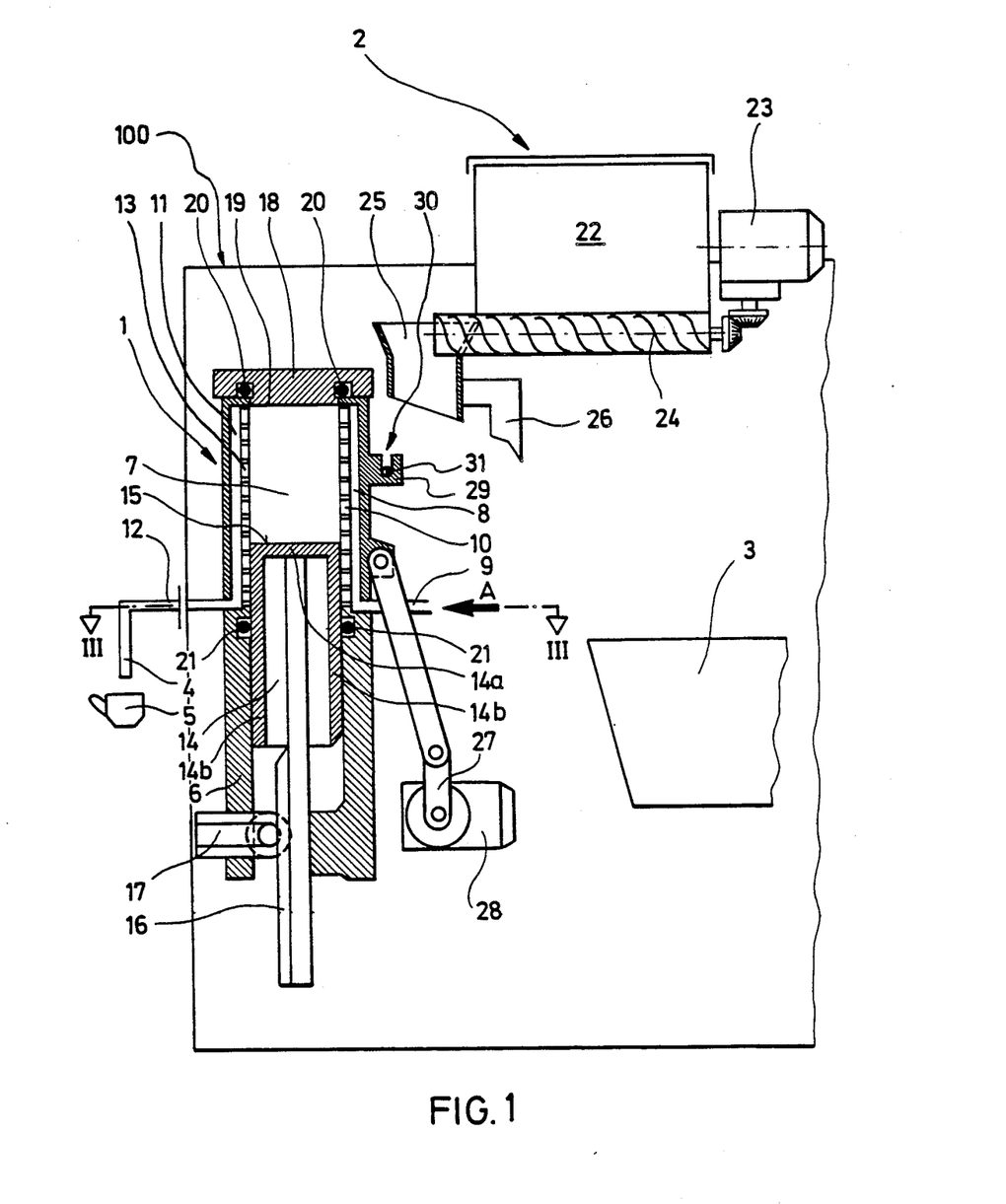
FIG. 1 shows a diagrammatic sectional view illustrating the main components of a coffee percolator according to the invention.

Shown in FIG. 1 is a diagrammatical illustration of a coffee percolator 100, depicting only the essential components for the performance of the present invention. The remaining requisite or desirable components for the operation of the coffee percolator, e.g. a water heater, a control unit etc. may be of conventional construction, so that they need not be shown and described. The components of coffee percolator 100 as shown include a brewing section 1, a coffee powder supply section 2, a disposal receptacle 3 for spent coffee powder, and a tap nozzle 4, shown on a reduced scale, for filling coffee receptacles as for instance a cup 5.

Figure 3:
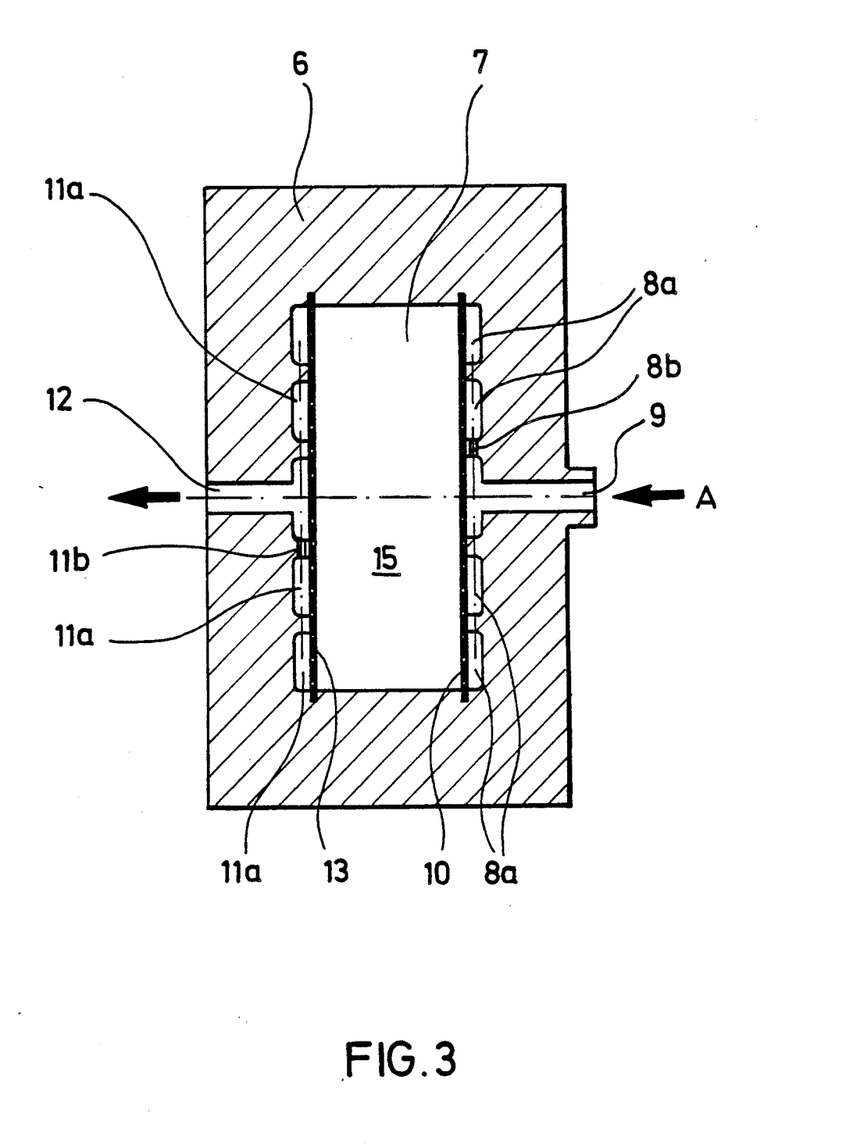
FIG. 3 shows an enlarged cross-sectional view taken along the line III—III in FIG. 1.

Brewing section 1 comprises a prismatic cylinder 6 of rectangular cross-sectional shape in the direction of flow A of the hot water as shown in FIG. 3, with a vertically extending axis in the position shown in FIG. 1.

The upper portion of cylinder 6 is formed as a brewing chamber 7. In one of the vertical sidewalls of cylinder 6, a distributor chamber 8 extends over the full area of brewing chamber 7, the lower end of distributor chamber 8 being connected to a supply duct 9 in the form of a hose for the supply in the direction of arrow A of hot water for brewing the coffee. Distributor chamber 8 is separated from brewing chamber 7 by a distributor sieve 10 acting to prevent coffee particles from entering distributor chamber 8 and to ensure uniform distribution of the hot water. The vertical sidewall of cylinder 6 opposite distributor chamber 8 is formed with a beverage collecting chamber 11 likewise extending over the full height of brewing chamber 7. Connected to the lower end of collecting chamber 11 is a drain duct 12 in the form of a hose leading to tap nozzle 4. Collecting chamber 11 communicates with brewing chamber 7 through a brewing sieve 13 extending parallel to distributor sieve 10 and spaced therefrom by a distance corresponding to the optimum thickness of the coffee powder bed of about 20 mm, preferably between 10 and 30 mm.

Slidably guided in cylinder 6 from below is a piston 14 of rectangular cross-sectional shape corresponding to that of cylinder 6, having a top wall 14a and at least two vertically extending sidewalls 14b. The horizontally extending top wall 14a forms at the lower boundary wall surface 15 of brewing chamber 7. The two sidewalls 14b extend downwards along the sides of piston 14 facing distributor chamber 8 and collecting chamber 11, respectively. Sidewalls 14b are preferably of a size enabling them to completely cover distributor sieve 10 and brewing sieve 13, respectively. Piston 14 is connected to a piston rod 16 formed as a rack. Engaged with rack 16 is a drive pinion of a geared motor 17 operable to displace piston 14 within cylinder 6 in such a manner that boundary wall surface 15 can be raised from at least the lower end of distributor sieve 10 or brewing sieve 13, respectively, to the upper end of cylinder 6 or even therebeyond.

The side of brewing chamber 7 opposite boundary wall surface 15 is closed by a plug 18 fixedly mounted in the coffee percolator and having a projection 19 received in cylinder 6 and sealed with respect thereto by a gasket 20. Piston 14 likewise cooperates with a gasket 21, so that brewing chamber 7 is sealed in a fluid-tight manner at its upper and lower ends.

Supply section 2 is of conventional construction, comprising a coffee powder supply hopper 22, a motor 23 for driving a metering screw conveyor 24 disposed adjacent the bottom of hopper 22 and terminating above a charging funnel 25. As shown in FIG. 1, funnel 25 is not disposed vertically above brewing section 1, but at a laterally offset position. Also provided is a stripper 26 the function of which will be explained as the description proceeds.

The cylinder-piston unit 6/14 is tiltable and mounted for limited vertical displacement. To this purpose it is connected to a crank arm 27 of a geared motor 28. Secured to cylinder 6 is a hook-shaped member 29 having an upwards facing notch 30 adapted to be engaged with a fixed pin 31 for locking cylinder 6 in its vertical position. Cylinder 6 may further be provided with guide pins (not shown) for engagement with likewise not shown guide slots in the housing of the coffee percolator for positively guiding brewing section 1 as it is being tilted by the operating of motor 28.

Figure 2:
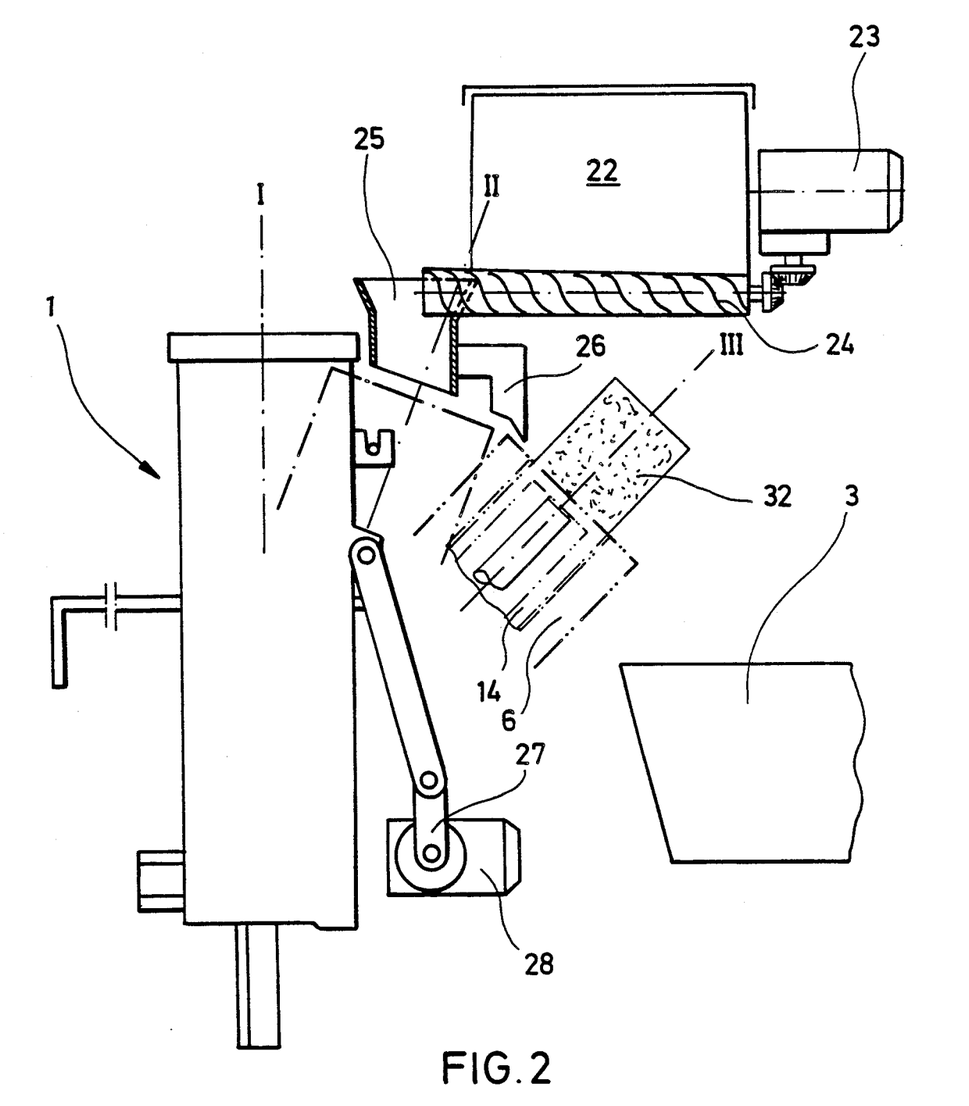
FIG. 2 shows the components depicted in FIG. 1, with the brewing chamber tilted to different positions.

The tilting movement of brewing section 1 is depicted in detail in FIG. 2, wherein I designates the brewing position, II designates the charging position, and III designates the discharge position of brewing section 1. At the beginning of a coffee-brewing cycle, brewing section 1 is in position II, with piston 14 retracted within cylinder 6. In this position the upper end of brewing chamber 7 is not closed by plug 18 and aligned instead below funnel 25 of supply section 2. After the desired quantity of coffee powder has been metered into brewing chamber 7, cylinder 6 is tilted to brewing position I. In this position cylinder 6 is raised by a small distance, so that fixed pin 31 enters notch 30 and projection 19 of plug 18 is received in the upper end of brewing chamber 7 which is thereby sealed in cooperation with gasket 20. Piston 14 is displaced upwards until the remaining volume of brewing chamber 7 is completely filled with the coffee powder. In the case of a small quantity of coffee powder, boundary wall surface 15 will then be located closely adjacent plug 18, while in the case of a greater quantity, it will be located in the vicinity of the lower end of sieves 10 and 13. In a coffee percolator equipped with means for the supply of hot water under increased pressure, the piston displacement may be used for compacting the coffee powder in the conventional manner for the preparation of espresso coffee. Irrespective of the quantity of coffee powder, however, the flow path of the hot water from distributor chamber 8 through the coffee powder to collecting chamber 11 is of the same length, so that the coffee powder is fully exploited in the case of both the smallest and the greatest brewing charges, and the percolation time is relatively short and substantially the same for any brewing charge. When boundary wall surface 15 is not disposed at the lower end of sieves 10 and 13, the sidewalls 14b of piston 14 cover the sieve openings not required and therefore excluded from the reduced volume of brewing chamber 7. In this manner it is ensured that the hot water enters brewing chamber 7. In this manner it is ensured that the hot water enters brewing chamber 7 only through the area defined between boundary wall surface 15 and cover 18, and the prepared beverage is discharged from brewing chamber 7 over a corresponding area. In the coffee brewing operation, hot water is directed through supply duct 9 into distributor chamber 8 as shown by arrow A. The hot water flows through distributor sieve 10 and saturates the coffee powder in brewing chamber 7 which is thereby extracted. The thus prepared coffee enters beverage collecting chamber 11 through the openings of brewing sieve 13, and then flows through drain duct 12 and tap nozzle 4 into the receptacle placed therebelow.

When the predetermined volume of hot water has percolated and the brewing operation is thus terminated, cylinder 6 is lowered to release its engagement with projection 19 of plug 18 and locking pin 31. Subsequently cylinder 6 is tilted to the discharge position III shown in FIG. 2. In this position piston 14 is advanced to expel the spent coffee powder 32 from brewing chamber 7. The spent coffee powder drops into disposal receptacle 3 for discharge from the percolator. This arrangement offers the advantage that the spent coffee powder is not discharged into the drains system where it could cause certain problems.

As cylinder 6 is tilted back towards charging position II, piston 14 remains in its upper position in which its top surface 14a lies flush with the upper edge of cylinder 6 or projects slightly thereabove. As cylinder 6 is thus tilted back, top surface 14a or 15 comes into contact with stripper 26 which acts to strip any remaining coffee powder residues from surface 15. In the charging position II of cylinder 6, piston 14 is again retracted, whereupon brewing chamber 7 may be supplied with a new charge of coffee powder for a subsequent brewing operation.

FIG. 3 shows a cross-sectional view of cylinder 6 with piston 14 retracted to a position in which boundary wall surface 15 is at its lower end position. In this position distributor sieve 10 and brewing sieve 13 are exposed over the full height of brewing chamber 7. As shown in this figure, distributor chamber 8 consists of a plurality of distributor channels extending parallel to the longitudinal axis of cylinder 6 at the rear of distributor sieve 10. Channels 8a are interconnected by transverse channels 8b. By a suitable arrangement of channels 8a and 8b it is ensured that the hot water supplied via duct 9 is evenly distributed over the entire percolating area.

In a similar manner, beverage collecting chamber 11 is composed of a pluralitY of collecting channels 11a extending parallel to the longitudinal axis of cylinder 6 and connected to one another via transverse channels 11b to thereby permit the percolated beverage to be uniformly drained from the entire percolating area for discharge through drain duct 12.

Figure 4:
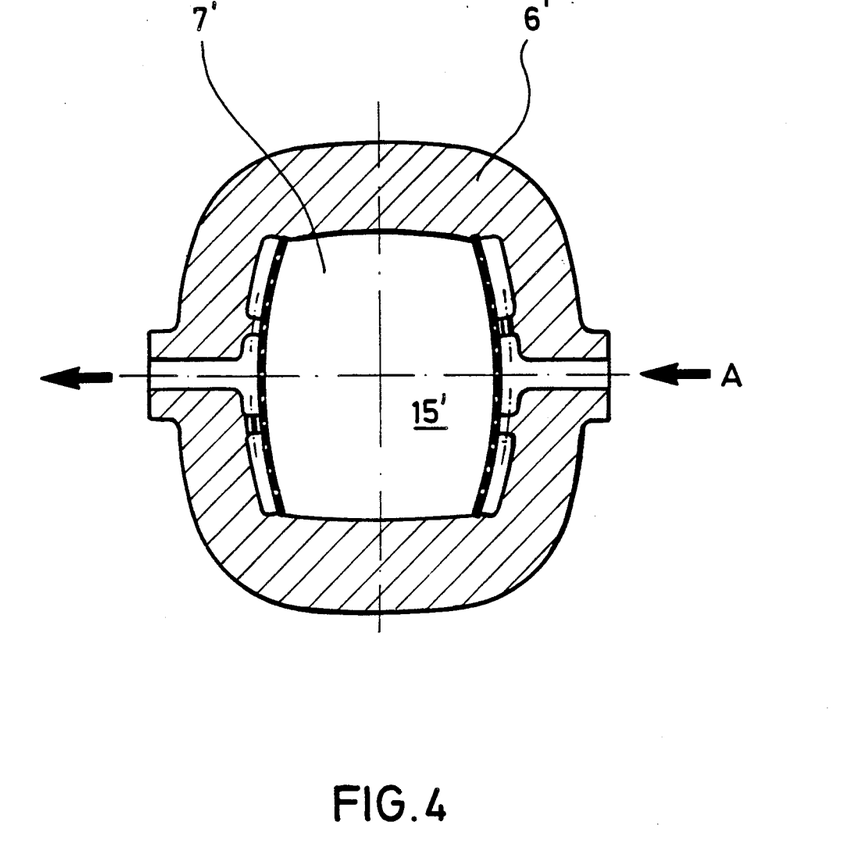
FIG. 4 shows a cross-sectional view of the brewing chamber in a modified embodiment.
Figure 5:
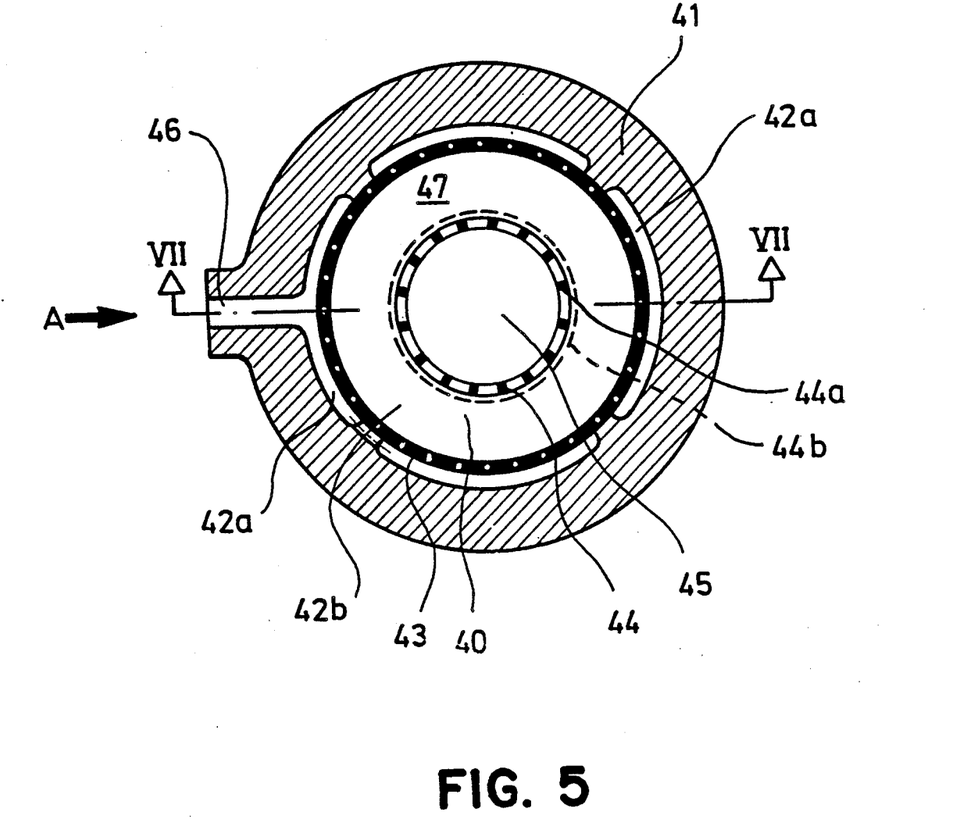
FIG. 5 shows a cross-sectional view of a brewing chamber of a further preferred embodiment.
Figure 6:
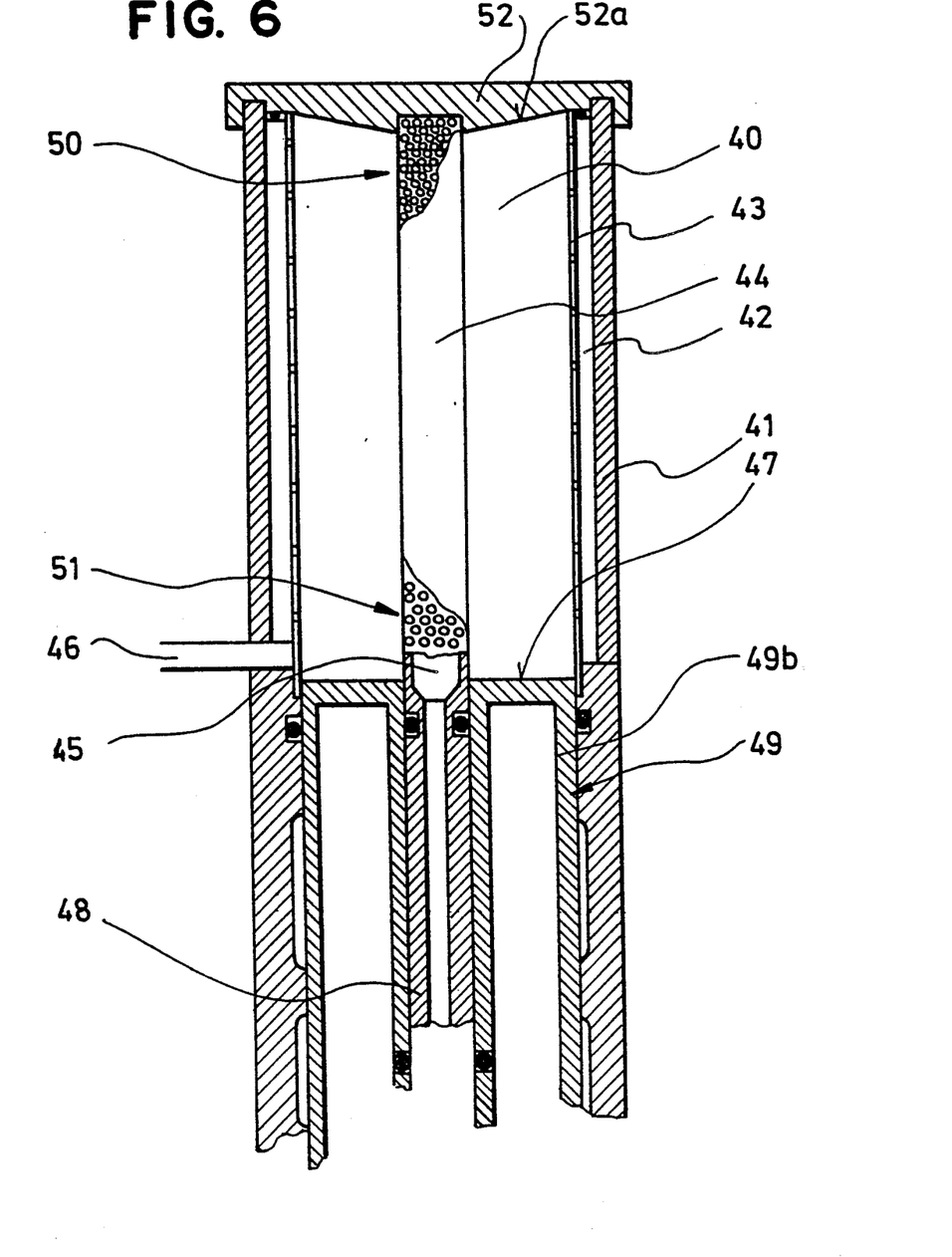
FIG. 6 shows a sectional view taken along the line VII—VII in FIG. 5.

Shown in FIGS. 4 to 6 are alternative cross-sectional configurations of cylinder 6 and boundary wall surface 15 in the direction of flow A. FIG. 4 shows a modified rectangular cross-section, in which brewing chamber 7' in cylinder 6' is defined by concave arcuate sidewalls and an adjustable boundary wall surface 15' of a corresponding shape.

FIG. 6 shows a cross-sectional view of another embodiment of a brewing chamber 40 formed within a circular cylinder 41. The interior wall surface of cylinder 41 is formed with circumferentially spaced distributor channels 42a extending in the longitudinal direction and interconnected by connecting channels 42b in the manner already described. Distributor channels 42a and connecting channels 42b are covered by a tubular sieve 43 acting as a distributor sieve. Coaxially disposed within tubular sieve 43 is a second tubular sieve 44 acting as a brewing sieve and having its diameter reduced by twice the desired thickness of the coffee powder bed. Tubular sieve 44 has an inner support sieve 44a provided with relatively large sieve openings of a size exceeding the dimensions of the coffee powder particles. The outer surface of support sieve 44a facing towards brewing chamber 40 is covered by a fine sieve 44b consisting for instance of a thin metal sheet formed with micro-openings etched therein or a liner hose made of nylon fabric. The sieve openings of fine sieve 44b are of course smaller than the coffee powder particles. Brewing sieve 44 surrounds a beverage collecting chamber 45. In a similar manner as explained above, hot water enters distributor channels 42 at the inner periphery of cylinder 41 through an inlet 46 in the direction of arrow A and passes through distributor sieve 43 into brewing chamber 40 one end of which is defined by an annular boundary wall surface 47 acting in he same manner as explained with reference to boundary wall surface 15. After passing through brewing sieve 44, the thus prepared beverage is drained from collecting chamber 45 extending through the center of boundary wall surface 47. It is also conceivable, however, to provide a flow in the opposite direction, i.e., outward from within, in which case the sieve covering the interior wall surface of the cylinder would act as the brewing sieve.

Figure 7:
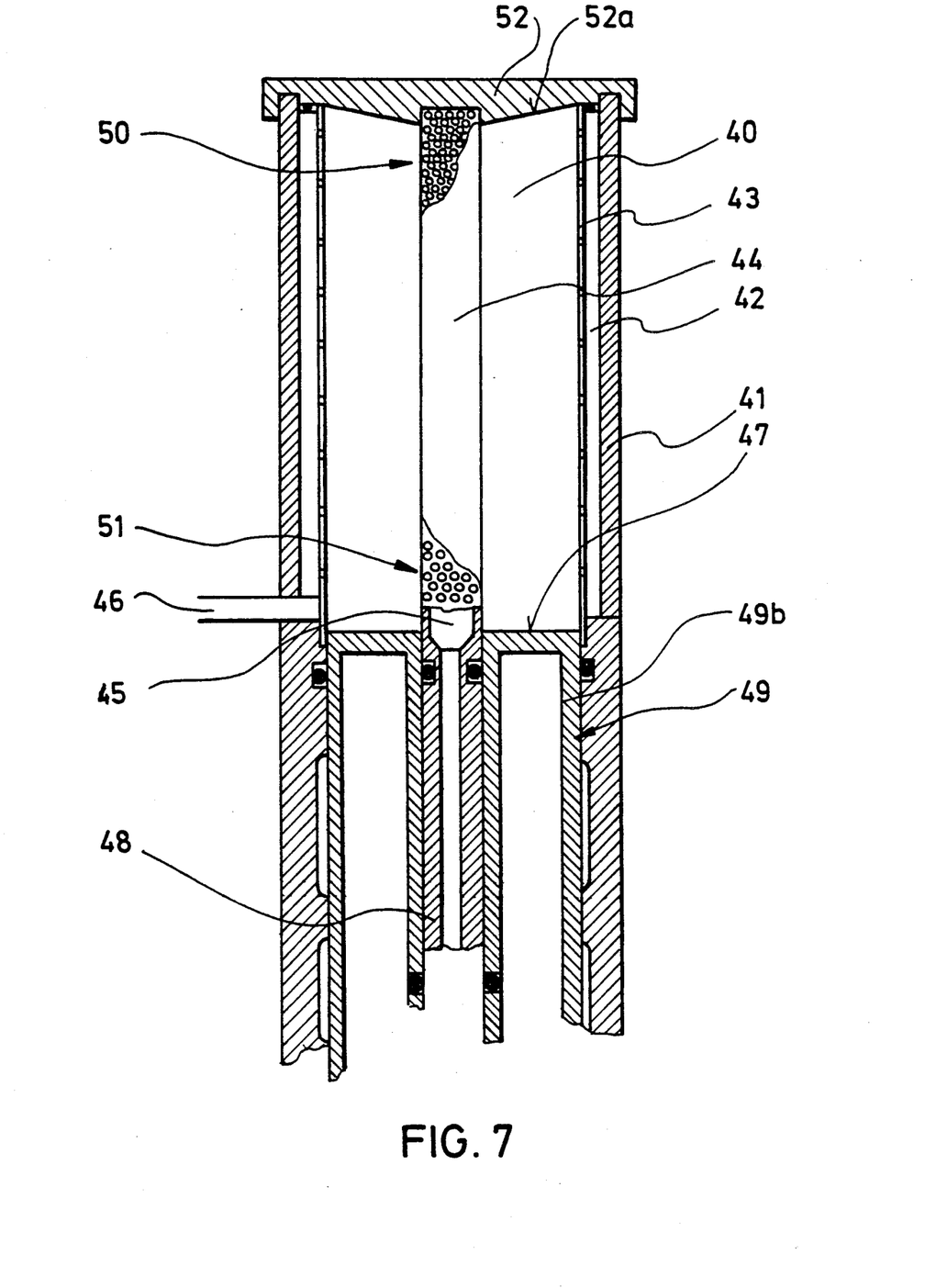

FIG. 7 shows a longitudinal sectional view of an embodiment similar to the one shown in FIG. 6. In this embodiment beverage collecting chamber 45 and brewing sieve 44 are associated to a sieve piston slidably and sealingly guided in a piston 49. In a manner similar to piston 14, piston 49 acts as a shut-off valve member 49b and slidably and sealingly guided within cylinder 41. This construction permits sieve piston 48 to be completely retracted into piston 49 before filing brewing chamber 40 with coffee powder, so that brewing chamber 40 initially has a full circular cross-sectional shape. After the desired quantity of coffee powder has been charged, sieve piston 48 is advanced into engagement with plug 52, in unison with the movement of piston 49 or independent thereof, so that the coffee powder charge is again agitated to thereby achieve a uniform packing density of the possible unevenly distributed coffee powder. When piston 49 is already in its position corresponding to the selected brewing charge, the subsequent advance of sieve piston 48 results in an additional compaction of the coffee powder charge.

FIG. 7 specifically shows a modified embodiment of the brewing sieve which may also be employed, however, in any of the other embodiments. As shown in detail in FIG. 7, the sieve openings in an upper portion 50 of brewing sieve 44 are of a smaller size than those in a lower portion 51 adjacent boundary wall surface 47. The size of the sieve openings may vary continuously or by degrees over the axial length of sieve piston 48. Furthermore the smaller sieve openings of upper portion 50 may be more numerous than the larger sieve openings at lower portion 51, so that the overall opening area may be kept substantially constant over the length of sieve piston 48.

A further modification which may be provided in any other embodiment in an analogous manner concerns the configuration of plug 52. The boundary wall surface 52a of brewing chamber 40 formed on plug 52 has the shape of a conical projection extending into brewing chamber 40 and acting as a stop for limiting the advance of sieve piston 48 or formed with a recess for sealingly receiving the upper end of sieve piston 48 therein. As a result, the effective surface area of the brewing sieve is reduced by a percentage specifically noticeable in the case of smaller charges. This reduction of the effective surface area is scarcely noticeable, however, in he case of larger brewing charges. When this embodiment is employed for preparing smaller charges of espresso coffee, the reduction of the effective surface area of the brewing sieve results in an increase of the filtration effect of the coffee powder itself and thus in an improved quality of the prepared beverage.

If the percolator is only to be used for making normal coffee, the conical shape of boundary wall surface 52a may be reversed, i.e., concave, to thereby increase the effective surface area of the brewing sieve by comparison to that of the distributor sieve, this effect being again only noticeable when preparing smaller quantities of coffee.

A further modification which may be provided in any embodiment relates to boundary wall surface 47 of piston 49. Boundary wall surface 47 may be elastically deformable or provided with an elastically deformable pad or similar projection. This modification is effective to avoid uneven compaction of the coffee powder charge in he case of uneven distribution or variations of the charged quantity.

The construction according to FIGS. 6 and 7 offers the further possibility to select a very small diameter for brewing sieve 44 as compared to that of distributor sieve 43, as illustrated in FIG. 7 as compared to FIG. 6. This results in a corresponding reduction of the effective area of the brewing sieve and a corresponding increase of the filtration effect of the coffee powder itself. In this case the brewing sieve may be not a micro-fine sieve, but rather a sieve having relatively large sieve openings of for instance 0.2 to 0.8 mm, without coffee powder particles passing into the finished beverage.

In modifications of the embodiments described and illustrated, the details of the various embodiments may be combined in any suitable manner. It is also possible to employ other cross-sectional shapes, for instance square or oval configurations. The brewing section is not necessarily to be designed as a cylinder-piston unit. The adjustable boundary wall surface may also be formed on a plunger. The brewing section may also be stationary and/or horizontally disposed in the brewing position, in which case the discharge operation is carried out in the conventional manner by rinsing. The various sieves may be formed with round or slot-shaped sieve openings or a combination thereof. The conical boundary wall surface shown in FIG. 7 may also be formed as the adjustable boundary wall surface as long as the removal therefrom of the spent coffee powder is ensured. Finally the hot water distribution chambers may be provided by forming the distributor sieve with integral ribs for spacing the sieve form the cylinder wall. A sieve of this type may be formed of plastic in a simple manner.

What is claimed is:

1. A sieve for use as a brewing sieve in a brewing chamber of a coffee making machine, said brewing chamber containing at least a first side wall and a second side wall opposite to the first side wall, the first side wall being moveable for adjusting and varying the volume of the brewing chamber, the sieve having a first end adapted to be arranged near the first side wall of the brewing chamber, a second end adapted to be arranged near the second side wall, and a surface adapted to face the brewing chamber, the sieve containing openings of differently sized cross-sectional areas, the openings being distributed over the surface of the sieve such that the size of the cross-sectional areas of the openings decreases in the direction from the first end towards the second end for increasing extraction time during brewing of smaller quantities of coffee.

2. The sieve of claim 1 wherein the numbers of openings of each specified size of the cross-sectional area is calculated such that the sums of the cross-sectional areas of all openings contained in parts of equal size of the sieve surface are equal over the full length of the sieve between the first and the second end.

3. A coffee percolator, comprising a brewing chamber having a hot water inlet and a beverage outlet disposed opposite said hot water inlet, said brewing chamber being adapted to receive variable amounts of ground coffee to thereby form a ground coffee bed for the hot water to percolate there-through for brewing variable charges of coffee, said brewing chamber having a boundary wall surface adapted to be adjusted substantially transversely of the direction of flow of the hot water to thereby obtain a substantially constant thickness in the direction of flow of the ground coffee bed when using different amounts of ground coffee for brewing different charges of coffee; said coffee percolator further comprising:
- a distributor chamber along a boundary wall of said brewing chamber;
- a distributor sieve substantially impermeable to the ground coffee, interposed between the distribution chamber and the brewing chamber and allowing communication between the distribution chamber and the brewing chamber;
- a beverage collecting chamber along the boundary wall opposite the boundary wall along which the distributor chamber is positioned; and
- a brewing sieve substantially impermeable to the ground coffee, interposed between the beverage collecting chamber and the brewing chamber and allowing communication between the beverage collecting chamber and the brewing chamber;

wherein said brewing sieve comprises a support sieve having openings of a size exceeding the dimensions of the ground coffee particles, and a fine sieve supported on the side of said support sieve facing towards said brewing chamber and having openings of a size smaller than the dimensions of the ground coffee particles.

4. A coffee percolator according to claim 3, wherein said brewing chamber is formed as an enclosed space with the distance between said hot water inlet and said beverage outlet substantially corresponding to the desired thickness of the ground coffee bed.

5. A coffee percolator, comprising a brewing chamber having a hot water inlet and a beverage outlet disposed opposite said hot water inlet, said brewing chamber being adapted to receive variable amounts of ground coffee to thereby form a ground coffee bed for the hot water to percolate there-through for brewing variable charges of coffee, said brewing chamber having a boundary wall surface adapted to be adjusted substantially transversely of the direction of flow of the hot water to thereby obtain a substantially constant thickness in the direction of flow of the ground coffee bed when using different amounts of ground coffee for brewing different charges of coffee; said coffee percolator further comprising:
- a distributor chamber along a boundary wall of said brewing chamber;
- a distributor sieve substantially impermeable to the ground coffee, interposed between the distribution chamber and the brewing chamber and allowing communication between the distribution chamber and the brewing chamber;
- a beverage collecting chamber along the boundary wall opposite the boundary wall along which the distributor chamber is positioned; and
- a brewing sieve substantially impermeable to the ground coffee, interposed between the beverage collecting chamber and the brewing chamber and allowing communication between the beverage collecting chamber and the brewing chamber;

further comprising a cover slide member for covering the hot water inlet openings and beverage outlet openings not required for brewing smaller coffee charges in a brewing chamber of reduced size.

6. A coffee percolator according to claim 5, wherein said brewing chamber is formed as an enclosed space with the distance between said hot water inlet and said beverage outlet substantially corresponding to the desired thickness of the ground coffee bed.

7. A coffee percolator according to claim 5 or 6 wherein said brewing chamber comprises a cylinder disposed substantially upright in the brewing position having said cover slide member slidably mounted therein, and wherein said adjustable boundary wall surface comprises a piston having a substantially horizontal boundary wall surface.

8. A coffee percolator according to claim 7, wherein the side of said brewing chamber in said cylinder opposite said adjustable boundary wall surface is closed by a removable cover.

9. A coffee percolator according to claim 8, wherein the side of said cover facing towards said brewing chamber is of conical configuration.

10. A coffee percolator, comprising a brewing chamber having a hot water inlet and a beverage outlet disposed opposite said hot water inlet, said brewing chamber being adapted to receive variable amounts of ground coffee to thereby form a ground coffee bed for the hot water to percolate there-through for brewing variable charges of coffee, said brewing chamber having a boundary wall surface adapted to be adjusted substantially transversely of the direction of flow of the hot water to thereby obtain a substantially constant thickness in the direction of flow of the ground coffee bed when using different amounts of ground coffee for brewing different charges of coffee; wherein the adjustable boundary wall surface is designed to be resiliently yieldable in the direction perpendicular to the flow direction.

11. A coffee percolator, comprising a brewing chamber having a hot water inlet and a beverage outlet disposed opposite said hot water inlet, said brewing chamber being adapted to receive variable amounts of ground coffee to thereby form a ground coffee bed for the hot water to percolate there-through for brewing variable charges of coffee, said brewing chamber having a boundary wall surface adapted to be adjusted substantially transversely of the direction of flow of the hot water to thereby obtain a substantially constant thickness in the direction of flow of the ground coffee bed when using different amounts of ground coffee for brewing different charges of coffee;

wherein said brewing chamber is of annular cross-sectional shape in the flow direction of the hot water;

and wherein the inner annular wall is formed as a sieve piston and mounted displaceably relative to said boundary wall surface.

12. A coffee percolator according to claim 11, wherein said hot water inlet extends through the outer annular wall and said beverage outlet extends through the inner annular wall.

13. A coffee percolator for automatically making preselectably variable charges of coffee, comprising a brewing chamber having:

a hot water inlet;

a hot water distributor sieve substantially impermeable to ground coffee and disposed between said hot water inlet and said brewing chamber allowing communication between said hot water inlet and said brewing chamber;

a beverage outlet disposed opposite said hot water inlet;

a brewing sieve substantially impermeable to ground coffee and disposed between said brewing chamber and said beverage outlet allowing communication between said brewing chamber and said beverage outlet;

said distributor sieve and said brewing sieve facing each other with a substantially constant distance therebetween;

said brewing chamber being adapted to receive said variable quantities of ground coffee to thereby form a ground coffee bed for the hot water to percolate there-through for brewing said variable charges of coffee;

said brewing chamber having a boundary wall surface arranged at a piston, said piston being adapted to be moved substantially transversely to the direction of flow of the hot water and coffee between said hot water inlet and said beverage outlet to thereby vary the size of said brewing chamber for adjusting a substantially constant thickness of the ground coffee bed in the direction of flow of hot water and coffee when using different amounts of ground coffee for brewing different charges of coffee;

said constant thickness of the ground coffee bed being defined by said distance between said distributor sieve and said brewing sieve; and said piston containing a cover slide member for covering openings of said hot water distributor sieve and said brewing sieve not required for brewing a smaller coffee charge in a brewing chamber of reduced size.

14. A coffee percolator according to claim 13, wherein said hot water inlet comprises a distributor chamber extending along a boundary wall of said brewing chamber, said distributor sieve being interposed between the distributor chamber and the brewing chamber;

and wherein said beverage outlet comprises a beverage collecting chamber extending along the boundary wall opposite the boundary wall along which the distributor chamber is positioned, said brewing sieve being interposed between the beverage collecting chamber and the brewing chamber.

15. A coffee percolator according to claim 14 wherein the brewing sieve has openings therein which vary in size along the adjusting movement of the adjustable boundary wall surface in increasing size in the direction towards the adjustable boundary wall surface.

16. A coffee percolator according to claim 15 wherein the sums of the cross-sectional areas of all openings contained in parts of equal size of the sieve are equal over the full height of the brewing chamber.

17. A coffee percolator according to claim 13 wherein said brewing chamber is of substantially rectangular cross-sectional shape in the flow direction of the hot water.

18. A coffee percolator according to claim 13 wherein said brewing chamber is of annular cross-sectional shape in the flow direction of the hot water.

19. A coffee percolator according to claim 18, wherein said hot water inlet extends through the outer annular wall and said beverage outlet extends through the inner annular wall.

* * * * *